June 6, 1967 K. W. KREISELMAIER 3,323,951
POROUS REACTION MEDIUM AND METHODS OF MAKING SAME
Filed June 22, 1964 2 Sheets-Sheet 1

INVENTOR.
Kurt W. Kreiselmaier
BY William D. Harris, Jr.
Attorney

FIG. 5

United States Patent Office 3,323,951
Patented June 6, 1967

3,323,951
POROUS REACTION MEDIUM AND METHODS
OF MAKING SAME
Kurt W. Kreiselmaier, Dallas, Tex., assignor to Texas Instruments Incorporated, Dallas, Tex., a corporation of Delaware
Filed June 22, 1964, Ser. No. 379,428
18 Claims. (Cl. 136—120)

This application is a continuation-in-part of application Ser. No. 337,051, filed Jan. 10, 1964, now abandoned.

This invention relates to a porous reaction medium and the methods of making same; more specifically, it relates to a porous reaction medium having particular utility as an electrode, and the methods of making such medium.

Porous reaction media are used in various applications where it is desired to bring two or more fluids into intimate contact over a diverse surface area.

In many applications, it is necessary that the fluids be in intimate contact with the porous medium as well as with each other. For example, at times the medium provides a catalytic function, a conductive function, or both.

An important application of porous reaction media is their use as electrodes. Porous electrodes are used extensively in fuel cells, and in some instances, in conventional batteries. Among the various types of porous electrodes employed, one of the most prominent is the "sintered" electrode, which consists of a multiplicity of discrete particles fused together to form a coherent porous mass. Liquid electrolyte is disposed in relation to this porous mass to permit the electrolyte to disperse over surface area in the pore structure of the mass. A reactant, usually a gas, is passed adjacent the porous mass to permit it to enter open pore structures and contact the exposed electrolyte dispersed over surface area in the pore structure of the mass. In some instances, it is desired that the electrode serve a catalytic function to promote the reaction between the reactant and liquid. In other instances no catalytic activity is required of the electrode.

For best results, a fuel cell electrode should provide a large area of contact so that the interface between the fluids in contact will in turn have a large area. Hence, it is desirable that the reaction medium employed as an electrode have a large number of very fine pores in order to provide a large surface area for the interface between reactants. On the other hand, in order to properly transfer reactants and products within the electrode, it is desirable that large pores be present. It is thus seen desirable that the reaction medium have a proper number of both small and large pores in order that both objectives can be realized. The prior art has approached the problem by blending a powdered "burn-out" agent with the powdered metal to be sintered into the electrodes' porous mass. On heating, the fine metal particles sinter (i.e., unite or fuse together) along adjacent surfaces to provide a mass with fine pore structure. In the process of sintering, the burn-out agent decomposes at the elevated temperatures involved. Essentially every particle of burn-out material will ultimately leave a void space in the end product. These void spaces throughout the sintered electrode are relied on to provide the mass transfer function of the large pores, discussed above.

The structure of the prior art, made by the burn-out technique described above, has certain defects. One of these is the unsatisfactory nature of the pore structure normally produced by the burn-out material. The pores do not intercommunicate properly. It is true that a large number of void spaces are present within the electrode structure; however, in general, intercommunication between these void spaces is obstructed by intervening material and they are connected only by way of the small pores in such intervening material. Moreover, the pore structure is uneven, irregular, and difficult to control. It follows that electrodes of the prior art are quite often easily polarized since mass transfer is not adequately provided. Moreover, the uneven, irregular, poorly connected, and often too small pores of the prior art tend to produce flooding, which tends to further increase polarization and decrease the active area in the electrode. Consequently, because of these factors power density (power output per given volume) is decreased.

The quantity of burn-out material may be increased in an effort to make pore structure adequate to provide good mass transfer, but by the time the desired mass transfer capability is achieved, the amount of electrode mass having fine pore structure has diminished to the point that only a comparatively small amount of surface area is provided as available contact area for the reactant and electrolyte. In any event, regardless of the amount of burn-out material used, low power densities are often experienced in electrodes fabricated in accordance with the burn-out technique. Moreover, where a large quantity of burn-out material is employed, the electrodes are structurally weakened, often to the point that they are not capable of self-support.

The fabrication of electrodes in accordance with prior art techniques posed the additional problem of evenly dispersing a catalyst throughout the electrodes pore structure in an economical and efficient manner.

Accordingly, it is an object of this invention to provide a porous reaction medium having a comparatively large surface area provided by its fine pore structure, yet at the same time having structure that permits good mass transfer of reactants and products into and out of its fine pores. It also is an object to provide methods for making such a porous reaction medium.

It is a further object to provide an electrode having a comparatively large internal contact area available for reactant contact, while, at the same time, having structure permitting effective mass transfer to and from the internal contact area. Moreover, it is an object to provide an electrode having such large contact area, yet providing proper mass transfer so that the electrode will function to produce high power densities, with little polarization tendency. It is a further object to provide methods for making such electrodes.

Yet an additional object of this invention is to provide a porous reaction medium, and more specifically, a porous electrode that meets the foregoing objects, yet which can be made cheaply and efficiently, and which has characteristics reasonably reproducible from one item to the next. Moreover, it is an object to provide such a reaction medium which achieves the foregoing objectives, yet which retains its structural integrity.

Yet an additional object is to provide a method for making a porous electrode realizing the objects stated above and, in addition, providing a catalyst dispersed throughout the pore structure to promote reaction.

In accordance with the invention, a porous reaction medium for fluids is provided which comprises macroparticles joined together by connecting structure into a coherent macroparticle matrix having a labyrinth of interconnecting, interstitial spaces therein. In addition, each of the macroparticles has a plurality of fine pores in it.

A preferred embodiment of this invention provides a porous electrode comprising a multiplicity of solid metallic macroparticles of metal selected from the group consisting of nickel and nickel alloys, silver and silver alloys, iron and iron alloys, cobalt and cobalt alloys, copper and copper alloys and manganese and manganese alloys. The macroparticles have a particle size of from about 20 mesh to about 250 mesh particle size and they are sintered together into a matrix having a labyrinth of interconnecting, interstitial spaces running between the macroparticles in the matrix. Each of the macroparticles comprises a plurality of microparticles of from about 250 mesh to the order of about one micron particle size which are sintered together to define a macroparticle structure having a plurality of fine pores.

In accordance with an alternative preferred embodiment of this invention a porous reaction medium is provided which comprises macroparticles joined together by structure into a coherent macroparticle matrix having a labyrinth of interconnecting, interstitial spaces therein. Each of the macroparticles comprises structure having a plurality of fine pores derived by selectively removing minute granules of materials entrapped in said macroparticles.

Moreover, this invention provides a reaction medium comprising macroparticles derived from comminuting a porous, dendritic electroplated mass of metal selected from the group consisting of nickel and nickel alloys, silver and silver alloys, iron and iron alloys, cobalt and cobalt alloys, copper and copper alloys and manganese and manganese alloys, said macroparticles being joined together into a coherent macroparticle matrix having a labyrinth of interconnecting, interstitial spaces therein. In a specific embodiment, each of the macroparticles comprises structure having a plurality of fine pores derived by selectively removing minute granules of material entrapped therein.

In accordance with one embodiment of this invention, an electrode is provided which comprises a metallic substrate having an electroplated deposit thereon of generally denditric structure. The deposit is formed by electroplating upon the substrate a metal from a plating solution comprising a multiplicity of suspended pore-forming granules of no larger than about 325 mesh and ions selected from the group consisting of nickel, silver, iron, cobalt, copper and manganese.

Another aspect of this invention is a process for forming a porous electrode comprising: heating in a compatible environment a mass of discrete microparticles of a metallic substance at an effective sintering temperature to sinter the particles into a porous mass; dividing the porous mass of sintered microparticles into a multiplicity of macroparticles, each of which contains a plurality of sintered microparticles; gathering the macroparticles into a mass of desired shape; and heating the macroparticles in a compatible environment to an effective sintering temperature to sinter the mass of macroparticles into a matrix of said macroparticles having a labyrinth of interconnecting, interstitial spaces therein.

An alternative aspect of this invention is a process for forming a reaction medium comprising: forming a porous particle growth by electroplating upon an electrode a metal selected from the group consisting of nickel, silver, iron, cobalt, copper and manganese from a plating solution comprising the ions of the metal; comminuting the particle growth to obtain a multiplicity of porous particles; gathering the comminuted particles so obtained into a mass; and heating the mass of particles at a sintering temperature to join them into a porous matrix.

For a more complete understanding of the present invention and for further objects and advantages thereof, reference may now be had to the following description taken in conjunction with the accomapnying drawings in which.

Figure 1:
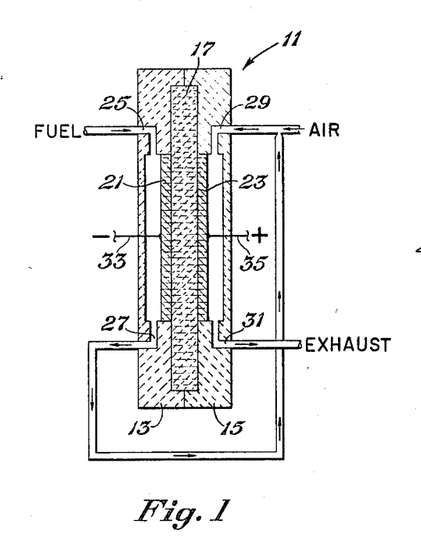
FIGURE 1 is a transverse cross-sectional view of a fuel cell, which includes a porous magnesium oxide disk carrying an electrode which is made in accordance with this invention.

Referring now to FIGURE 1, therein a fuel cell is illustrated generally at 11. It is to be understood that fuel cell 11 is treated herein merely to show an application of the instant invention and that the fuel cell 11 in itself, apart from the electrodes utilizable with it, does not comprise any part of this invention.

In FIGURE 1, fuel cell 11 has an outer casing made up of the two casing halves 13 and 15. Porous magnesium oxide disk 17 is centrally enclosed between the casing halves 13 and 15. It is permeated with a sodium-lithium carbonate eutectic mixture in molten state, the cell being maintained at a temperature above the melting point of the sodium-lithium carbonate. One electrode is provided by a porous sintered nickel mass 21, which joins an outer face of the disk 17, and the other by a porous sintered silver mass 23 which joins the opposite side of said disk. By way of illustration, consider that the electrode 23 is made in accordance with the present invention. Nickel electrode 21 may likewise be made in accordance with the present invention, if desired.

Fuel inlet 25 and spent fuel outlet 27 are provided in casing half 13, and air inlet 29 and exhaust passage 31 are provided in casing half 15. Suitable wires 33 and 35 are conductively joined with the electrodes 21 and 23, and pass through the casing halves 13 and 15, respectively, to connect with an external circuit. In operation, a fuel gas containing a substantial quantity of hydrogen, for example, a pure stream of hydrogen, is fed into the fuel cell of FIGURE 1 through inlet 25, wherein it passes adjacent and partially permeates pore structure of the electrode 21. Spent fuel gas thereafter passes out of the cell through conduit 27 to join air being fed into the fuel cell 11, through air inlet 29. The spent fuel provides carbon dioxide for the air electrode (electrode 23). The air and spent fuel mixture pass adjacent and partially permeate pore structure of electrode 23. The exhaust from electrode 23 discharges through exhaust passage 31. The sintered electrodes 21 and 23 provide interfaces between the fuel and electrolyte, and the air-carbon dioxide mixture and electrolyte, respectively, which function as fuel and oxidizer electrodes in contact with the electrolyte of the cell.

The molten sodium-lithium carbonate in the porous disk 17 partially permeates pore structure of the electrodes 21 and 23. Since fuel and oxidizer gases are in the pore structure of the respective electrodes 21 and 23, it will be appreciated that contact between fuel gas and the electrolyte, and between the oxidizer gas and the electrolyte, is actually accomplished on gas-liquid interfaces on electrode surface areas within the electrodes. Thus, the electrodes 21 and 23 are each seen to provide a conductive reaction medium. The extent of contact between electrolyte and reactant gas will depend upon the effective contact area provided by the pore structure of the electrode. Not only must the contact area provided by the multiplicity of small pores be large, but for effective operation, it will be appreciated that good mass transfer of electrolyte and gases must be provided by the electrode structures in order for the reactants and electrolyte to continue effective reaction.

The reaction at the fuel electrode (electrode 21) is as follows:

$$H_2 + CO_3^= \rightarrow H_2O + CO_2 + 2e^-$$

Note that nickel electrode 21 provided the function of catalyzing the reaction, in addition to serving as an electrode.

The electrode on the air side, electrode 23, is of sintered silver. The reaction at the air electrode is as follows:

$$\tfrac{1}{2}O_2 + CO_2 + 2e^- \rightarrow CO_3^=$$

In practice, the operation of the fuel cell of FIGURE 1 is at a temperature in excess of about 500° C., for example, at about 600° C., in order to maintain the sodium-lithium carbonate eutectic in liquid state.

The structure of electrode 23 is representative of electrode structure in accordance with the present invention. Electrode 23 has both a large number of small pores, providing for a large contact area between the fluid reactant (gaseous mixture of air and spent fuel) and electrolyte, and a highly effective, interconnected system of large pores, providing for good mass transfer to and from the contact area.

It simplifies the explanation of the structure of electrode 23 and of the general structure of a porous reaction medium in accordance with this invention to first consider a hypothetical situation. Consider such a hypothetical situation in which a multiplicity of spherical metallic particles of uniform diameter are to be used to fabricate an electrode. The particles are referred to for convenience as "microparticles." In accordance with the method aspect of this invention, these microparticles are gathered into a mass, as in a crucible, and permitted to heat in an oven for a predetermined time until fusion of the microparticles has occurred, in the vicinity of their tangent surfaces. The resulting coherent mass will be observed to have a multiplicity of very fine pores throughout its structure. The coherent mass is then broken up, as by a ball mill, into a multiplicity of spherical pieces, each containing a plurality of microparticles. Assume that these pieces are each perfectly spherical and of uniform diameter. They are referred to, for convenience, as "macroparticles."

The macroparticles, each comprising a number of the small microparticles, for example, 10 to 250 each, are next supported in a desired shape, as in an impervious ceramic container. The shape may be whatever shape is needed for a specific reaction medium or electrode. Such shape might be, for example, cylindrical or rectangular. The supported mass of spherical pieces is then placed in an oven and raised to a sintering temperature to permit the mass of pieces to sinter. The product consists of a coherent mass of macroparticles which are fused together in the vicinity of the various points of tangency between the individual pieces. Each macroparticle is made up of a multiplicity of the microparticles, sintered together.

Figure 2:
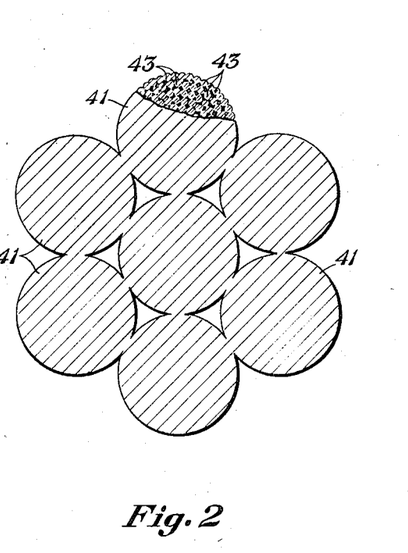
FIGURE 2 is an illustrative cross section, exaggerated in size, through part of a reaction medium made in accordance with the method of this invention. The materials of construction are hypothetical particles of perfect spherical shape.

FIGURE 2 illustrates the general appearance of the end product of the process just described. Each uniform macroparticle 41 is made up of a coherent mass of individual microparticles 43. Note that the uppermost macroparticle 41 of FIGURE 2 has its top portion illustrated in detail to show a portion of the multiplicity of sintered microparticles 43 that form a macroparticle 41. As would be expected, a plurality of small pores is defined between the outer surfaces of the microparticles 43.

In FIGURE 2, attention is directed to the relatively large void spaces, i.e. the interstitial spaces or interstices, occurring between the macroparticles 41. While a certain amount of fusion does occur in most instances to produce a throat of juncture between originally tangent spheres when they are sintered, this amount of fusion and the resulting size of such throats is relatively small. Therefore, and particularly for purposes of explanation and visualization, it may be considered that the spheres 41 of FIGURE 2 are joined together with little more than point contact, and that the resulting structure consists of a coherent framework of essentially tangent spheres.

A coherent mass of marbles, in a drinking glass, for example, would have the same mass to void geometric relationship as does the coherent mass of macroparticles 41 of FIGURE 2. This ignores the microparticles in each macroparticle and treats each macroparticle as a simple, solid marble. Visualizing such a structure, it will be recognized that a multiplicity of interstitial spaces will be regularly provided throughout the structure, and it will further be appreciated that these interstitial spaces will be intercommunicating. Note that a sectional view alone, as the section of FIGURE 2, cannot within its single plane properly illustrate the intercommunication; however, visualization of the structure in three dimensions (as the analogous marbles, for example) will readily reveal the existence of an intercommunicating network of such interstitial spaces. Thus, the structure of the sintered macroparticles of FIGURE 2 provides a labyrinth of interconnecting, interstitial spaces running throughout the mass of the macroparticles.

Figure 3:
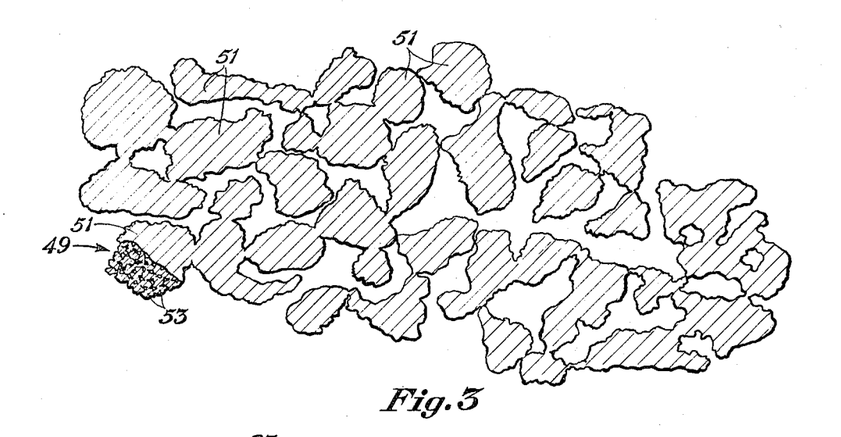
FIGURE 3 is a schematic view of a cross section through an electrode 23 of the fuel cell of FIGURE 1, which electrode is made, in accordance with this invention, of micro and macroparticles of shapes apt to be encountered in practice.

Referring now to FIGURE 3, a greatly enlarged cross section of the portion of electrode 23, fabricated in accordance with the method aspect of this invention, is schematically represented therein. While the diagram is schematic in nature, the particles involved are not assumed to be of an idealized shape. They are of varying size and shape. Referring to the general area indicated at 49 in FIGURE 3, a portion of one particle 51 is detailed to indicate its structure. Note that the macroparticle 51 is made up of a sintered plurality of microparticles 53. The balance of the particles 51 have a similar structure.

The coherent mass of particles of FIGURE 3 has an interstitial space structure analogous to that discussed in connection with FIGURE 2. Visualizing a pile of random-shaped rocks, or crushed ore, will give some concept of the interstitial space relationship of the structure of FIGURE 3, when such relationship is considered in three dimensions. It is thus seen that a plurality of interconnecting, interstitial spaces are provided. In a few instances, a space may result which does not interconnect; however, in general a structure will result having a plurality of interstitial spaces rather analogous to that of FIGURE 2. Such a structure is in distinct contrast to the isolated pocket pattern of prior art structure.

Figure 4:
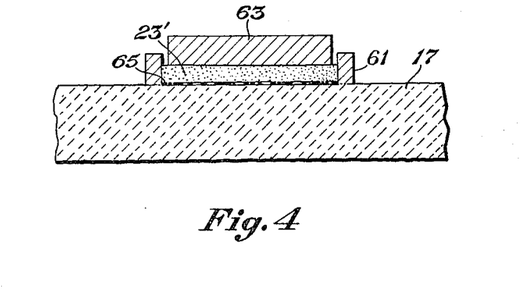
FIGURE 4 is a partial longitudinal cross section through a porous magnesium oxide disk with macroparticles to be sintered onto an electrode properly positioned on an upper face.

FIGURE 4 illustrates how electrode 23 of FIGURE 1 may be fabricated, including its attachment to magnesium oxide disk 17. First, a plurality of microparticles are placed on a suitable support, for example, in a ceramic crucible or in a pan of mild steel. The support bearing the particles is then placed in an oven under appropriate sintering conditions for at least about one-half hour. The sintering temperature is so selected that the material to be sintered bonds well, but does not melt into a nonporous mass. Appropriate sintering conditions vary for different materials, and appropriate temperatures will later be mentioned for some materials. In general, however, an appropriate sintering temperature is known for most materials and in those instances where not known, it can be readily determined. In the case of silver, sintering may be accomplished in air, since the oxide is unstable at the temperature involved. It should be noted that in some instances, however, it will be desired that an oxygen-free compatible atmosphere be provided in the sintering oven to minimize oxidation effects on the metals being sintered. In many cases, nitrogen, argon, helium and a multiplicity of other relatively inert gases are suitable to provide such an inert atmosphere. In other instances, a reducing atmosphere such as is provided by hydrogen or carbon monoxide, will be desirable.

The reaction mass is removed from the oven and allowed to cool. Of course, in those instances where high temperature exposure to an oxidizing atmosphere would be harmful, or where thermal shock might be critical, the cooling is accomplished in the oven. Thereafter, the support bearing the reaction mass is removed and the mass is broken up by appropriate means into macroparticles of silver. In some instances, breaking the sintered mass of microparticles into macroparticles can be accomplished by a ball mill. In other instances, some type of grinding operation best performs this function. In the case of the silver mass, the division into macroparticles may be accomplished satisfactorily with a sharp, fine blade.

The macroparticles lying within the screen fraction between 100 mesh and 200 mesh, American Screen Size, are collected and placed upon the magnesium oxide disk 17 of FIGURE 4. These particles are represented at 23′ in said FIGURE 4. After fusion, they will form the electrode 23 of FIGURE 1.

Particles 23′ are held in position by means of annular metal ring 61, lying on top of the surface of magnesium oxide disk 17. Further note that a metallic disk 63 lies on top of the metal particles 23′ to compact them somewhat.

Attention is directed to the thin, porous layer of silver 65 in FIGURE 4, where its thickness is exaggerated for purpose of illustration. Layer 65 lies on the upper central surface area of magnesium oxide disk 17. It is bonded to the magnesium oxide disk, having been applied thereto by flame spray technique, a technique well-known in the art. The silver layer 65 insures a bond between the electrode 23 being formed from macroparticles 23′ and the magnesium oxide disk 17. This layer of silver is quite thin and is porous. It does not, therefore, substantially obstruct communication between the pores of the magnesium oxide disk and the pores in the electrode structure bonded thereto.

The magnesium oxide disk, carrying the material 23′, supported as described above and as illustrated in FIGURE 4, is next put into an oven. The disk and particles are allowed to remain in the oven at a temperature of approximately 850° C., for about 1 hour. Thereafter, the magnesium oxide disk is removed. After cooling, the metal ring 61 and metallic disk 63 are removed from their positions. It is found that the material 23′ has sintered to form porous electrode 23, having a multiplicity of macroparticles joined to define a matrix of macroparticles defining interconnecting, interstitial spaces, each of the macroparticles being made up of a plurality of microparticles. The electrode 23 is further found to be bonded to the silver layer 65 so that electrode 23 and the magnesium oxide disk 17 are effectively joined. Intercommunication between the pore structure of the magnesium oxide disk and the internal portion of electrode 23 is found to be satisfactory.

Figure 5:
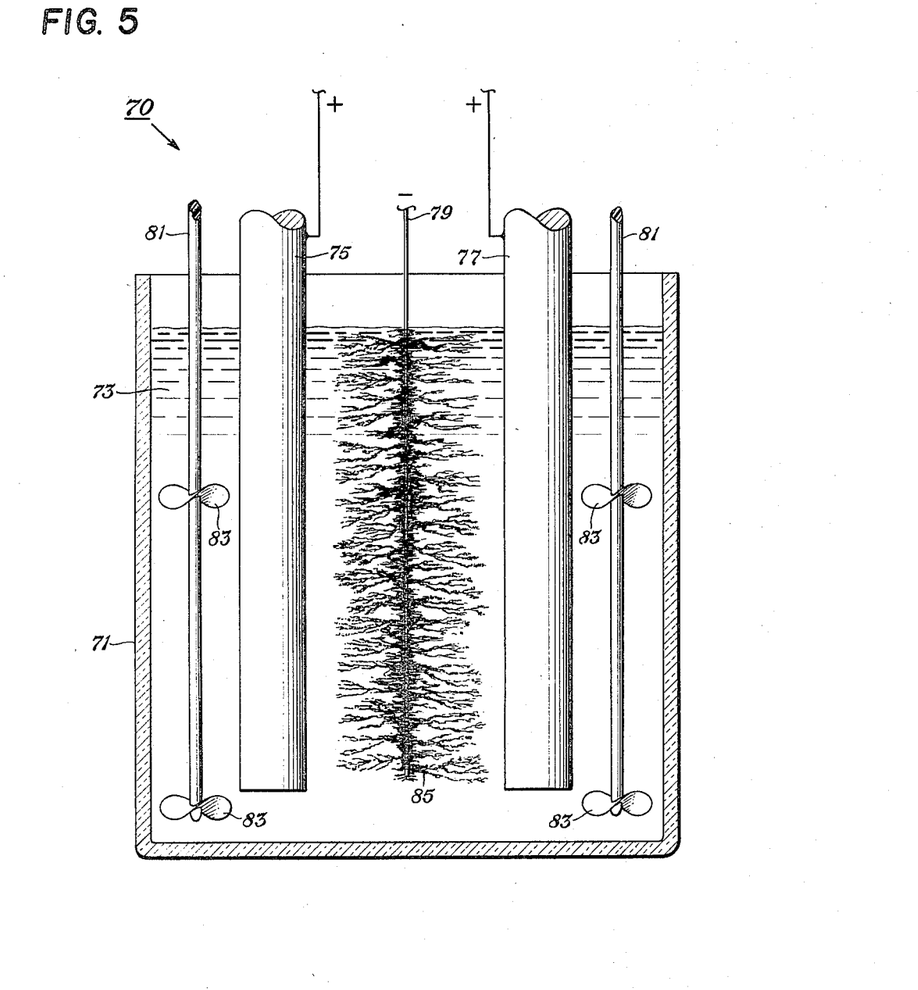
FIGURE 5 is a cross-sectional view through an electroplating apparatus which may be utilized in an alternative method of forming material having utility in accordance with an embodiment of this invention.

Turning now to FIGURE 5, therein is illustrated generally at 70 an electroplating apparatus which may be utilized to form material having utility in accordance with an embodiment of the present invention. In FIGURE 5, the container 71, of glass or ceramic, for example, is filled with an electroplating bath 73. The bath 73 contains ions of the metal or metals which is desired to be obtained in suitable form for the manufacture of a reaction medium, such as an electrode. For example, if the reaction medium to be manufactured is to be made of nickel, the bath contains nickel ion in relatively high concentration. The cylindrical electrodes 75 and 77 are spaced apart anodes. They are made of the metal to be plated, for example, if nickel is to be plated they are made of nickel. A cathode is provided by a rod or wire 79 which extends downwardly into the center of the bath, and which is spaced apart from the anodes 75 and 77. The cathode 79 may be made of stainless steel, for example. Attention is directed to the fact that two anodes are used. This is merely a matter of convenience, it being possible to use only one, or an excess of two if desired. Likewise, it is possible, and sometimes quite desirable, to use a plurality of cathode members such as 79.

A pair of Teflon stirring rods 81 extend into the plating solution 73. Each rod is provided with conventional drive means and supports (not illustrated) and carries on it impellers 83 which are made of non-conductive material, for example, Teflon. In FIGURE 5, four such impellers 83 are illustrated. During the electroplating process conducted with the electroplating apparatus 70, the stirring rods are rotated to provide agitation in the plating solution 73.

When a voltage is applied across the anodes 75 and 77 and the cathode 79 of the apparatus of FIGURE 5, electroplating occurs. A deposit of the metal plates on the cathode 79. In the case where the material to be plated is nickel and the plating solution 73 contains nickel ion, deposit formed on the cathode 79 is of nickel. It will be noticed from FIGURE 5 that the deposit is illustrated as having a tree-like appearance. Thus, a plurality of branches of nickel deposit or growth 85 are seen to be formed upon the cathode 79. The deposit or growth extends primarily in the direction of the anodes. The resulting growth product has a relatively oriented structure of a linear, rod-like character. Moreover, the overall growth consists of a large number of rod-like elements or particles. The general structure of the growth is such that a comparatively large number of pores are present in it. The presence in the plating bath 73 of suspended particles of a suitable material which are entrained or entrapped in the growth structure during its deposit further enhance the porosity. Such suspended pore-forming particles are preferably of a conductive material which can subsequently be removed either from the growth 85 or from an electrode or other reaction medium ultimately formed from said growth. An example of a preferred pore-forming particle to be suspended in the bath is carbon. Carbon particles of less than 325 mesh are found to be particularly effective.

For best results, the plating operation conducted in accordance with FIGURE 5 in the description above is done at high current densities. To obtain a growth or electrodeposit having preferred pore characteristics, it is found that current densities of a minimum of about 150 amps. per square foot should be employed. A preferred range of operation is in excess of about 250 amps. per square foot, the upper limit being dictated primarily by heat transfer considerations.

After a particle growth such as illustrated by the plurality of growth branches 85 is obtained from the apparatus of FIGURE 5, the electrode is removed from the bath and the branches 85 of growth scraped therefrom. The growth is then finely divided by suitable means, as by pulverizing it in a crucible or by milling it to comminute the growth into a multiplicity of particles. While these particles are small; as a comparative matter it is pointed out that they are still in the macroparticle range insofar as utilization in connection with this invention is concerned. To obtain particles of the desired size, the resulting mass of particles are preferably sieved. The particle size of a preferred fraction obtained by screening or sieving runs from about 20 mesh to about 250 mesh. It should be observed that the resulting particles consist of a high proportion of individual particles that are of a rod-like, dendritic shape, having one dimension substantially longer than the others. Such rod-like particles are obtained because of the general linear, rod-like structure of the deposit or growth comminuted.

The sieved particles derived from comminuting the electrodeposited growth (as represented by the growth branches 85) are thereafter assembled in a mass of desired shape and sintered. For example, the particles may be assembled in analogous manner to that illustrated in FIGURE 4 and sintered in a reducing atmosphere in order to obtain a final product useful as a reaction medium, specifically as an electrode.

The high percentage of rod-like macroparticles obtained by the procedure just described makes the ultimate electrode product quite desirable. The macropore structure of an electrode made up of a multiplicity of such dendritic particles provides very good mass transfer and is preferred for many applications over the structure obtained wherein interconnected macroparticles defining the macropore structure are more nearly spherical, i.e. a particle mass possessing a preponderance of particles each having one of its dimensions which is comparatively larger than its others is preferred to a particle mass possessing a preponderance of particles each having its dimensions relatively uniform. In either event it will be appreciated that the macroparticles, whether dendritic or non-dendritic, are joined in the electrode product to define a labyrinth of interconnecting, interstitial spaces.

When forming electrode material in accordance with the electroplating aspect of this invention, in some instances it is desired to utilize the electrodeposit obtained directly without breaking up the deposit into macroparticles. For example, a nickel wire screen may be utilized as the cathode in a plating bath and the plating operation conducted in accordance with the preceding description herein. The wire screen with the electrodeposit or growth adhered to it may be removed from the plating bath and the resulting product utilized directly as an electrode or other reaction medium. Effectively, it will be seen that the resulting product is a nickel screen substrate having a dendritic deposit of the desired metal upon it.

While a certain amount of fine micropore structure will result if plating is conducted at high current densities, preferably over about 150 amps. per square foot, best results are obtained when pore-forming particles (referred to hereinafter as granules) are suspended in the plating bath from which the electrodeposit is formed. When pore-forming granules are used in the electroplating bath, as for example granules of carbon, these granules should preferably be no larger than about 325 mesh in size (preferably ranging from 325 mesh down to on the order of about one micron) in order to obtain the proper microporosity desired in the electrodeposit or growth. The pore-forming granules are particularly effective in becoming regularly entrapped throughout the electrodeposit if they are of a conductive material. Carbon granules are quite effective for this reason. In some instances where poreforming granules are utilized in accordance with the electroplating aspect of this invention, the granules will be selectively removed from the ultimate electrode product by leaching action of the electrolyte. For example, if the ultimate product made from the electroplated growth-derived material is used as an electrode in a molten carbonate fuel cell, for example a 50 mole percent sodium carbonate—50 mole percent lithium carbonate electrolyte-type cell, the electrolyte is found to quickly leach carbon granules from the electrode. Alternatively, it is desirable in some instances to selectively remove the granules from the electrodeposited material by oxidation or by treating the electrodeposit with an appropriate leaching solution to dissolve the granules prior to the use of the ultimate electrode product for its intended purpose. Such treatment may be accomplished either prior to or after sintering the electroplated growth particles.

In certain instances pore-forming granules may be utilized which are not later leached out or otherwise removed. Thus, if small metallic granules (containing a metallic catalyst for example) preferably less than 325 mesh in size are suspended in the electroplating solution, the growth on the cathode will contain a large number of these granules dispersed throughout it. The granules enhance the discontinuity of the structure of the electrodeposit formed and thus increase porosity even though they are of a type material that may not later be removed from the structure. In some instances granules may be utilized which have a catalytic or other beneficial action in addition to the increasing of porosity of the electrode structure.

When pore-forming granules are utilized in the present invention, best results are obtained if a wetting agent (for example, methanol) is incorporated in the plating solution or bath. The function of the wetting agent is to cause the wetting of the granules by the solution and hence help keep the granules dispersed throughout the solution in a state that they are subject to efficient and uniform mass transfer to the cathode during plating.

The following quite specific examples of methods of making a reaction medium, more specifically, an electrode, in accordance with this invention are offered by way of illustration, and are not to be taken as in any way limiting.

*Example 1*

Silver macroparticles are made as follows: Fifty grams of fine silver powder (through 325 mesh screen, American Screen Size, and running down to the order of about one micron-particle size) are placed in a small alumina crucible. The crucible was then put in an oven where it was maintained at a temperature of about 550° C. for one hour. The crucible, with its contents, is removed from the oven and permitted to cool. A coherent mass of microparticles having a multiplicity of fine pores is found to have formed.

This pre-sintered material is then broken up with a sharp bladed knife (having a blade similar to a razor blade) into macro-particles on the order of from about 100 to 200 mesh. The resulting particles are screened and the fraction from 100 to 200 mesh is collected.

Three grams of the 100 to 200 mesh fraction of macroparticles is placed inside a mild steel ring on top of a magnesidum oxide disk. The surface of the disk is provided with a thin layer of silver, applied by flame spray technique. The macroparticles are weighted down to compact them somewhat by a metal disk on top of the particle surface. This operation is analogous to that previously described in connection with FIGURE 4. The disk bearing the particles is then placed in an oven and maintained at about 800° C. for approximately one hour.

On removal from the oven, after cooling, a coherent silver electrode disk comprising a multiplicity of macroparticles, each made up of a plurality of microparticles, is found to have formed. The electrode comprises a matrix of interconnected macroparticles, joined to define a labyrinth of interconnecting, interstitial spaces between the macroparticle structure throughout the electrode. Moreover, each macroparticle comprises a plurality of microparticles defining micropore structure. The resulting electrode is found to be bonded to the flame sprayed layer of silver on the surface of the magnesium oxide disk. It is communicable with the pore structure of the magnesium oxide disk.

The electrode product of this example is found to produce a comparatively high power density when it is used as an air electrode in a molten carbonate fuel cell such as that of FIGURE 1. Mass transfer through the electrode is good. The life characteristics of the electrode are also good.

*Example 2*

Example 1 is repeated, except the microparticles are made somewhat larger, the fraction from 30 to 50 mesh (American Screen Size) being used for the final sintering step.

An excellent electrode, similar in characteristics to that described in connection with Example 1, is obtained. The resulting electrode is used as an air electrode in the fuel cell of the type illustrated in FIGURE 1. Over a sustained period of operation as an air electrode, excellent results were obtained; however, power density, while still good, is somewhat lower in the molten carbonate electrolyte system (FIGURE 1 and related discussion) involved than was the case for the electrode of Example 1.

*Example 3*

Fine nickel powder, the particles being of approximately spherical shape and having a diameter of on the order of about 20 microns, is used as the material of construction in this example. Such particles may be obtained by decomposition of nickel carbonyl.

Fifty grams of nickel microparticles are placed in an alumina crucible and pre-sintered in an oven at 800° C., in a reducing atmosphere provided by hydrogen gas. Preferably, the depth of material is kept shallow, hence, a large alumina crucible or shallow alumina dish is used. This permits good hydrogen contact during the pre-sintering operation. After one hour's exposure at 800° C. in the hydrogen atmosphere, the particle mass is allowed to cool. The crucible is removed from the oven and the sintered mass of microparticles is ground to a small particle size. The 100 to 200 mesh particle fraction is then collected and used as the macroparticles of this example.

The procedure described in connection with Example 1, whereby three grams of the macroparticles are sintered upon a magnesium oxide disk, is then followed with the nickel macroparticles of this example, except a temperature of 900° C. is used for sintering and the oven is provided with a hydrogen atmosphere. Moreover, the magnesium oxide disk has a thin, porous layer of nickel flame sprayed on its electrode contact face in place of the silver layer of Example 1. To permit good contact of the hydrogen with the particles being sintered, a weighted porous ceramic disk is laid on top of the particles in place of the metal disk described in connection with FIGURE 4 and used in Example 1.

Thus, hydrogen is in communication with the nickel particles via the pore structure of the ceramic disk. After one hour at the sintering temperature in the oven, the mass of nickel macroparticles is permitted to cool in the hydrogen atmosphere of the oven. On removal from the oven, an efficient, porous nickel electrode is found to have formed upon the magnesium oxide disk. The electrode has good mass transfer characteristics as well as a large surface area provided by fine pore structure. Its structure is generally similar to the structure of the silver electrode of Example 1. It functions quite well at high power density as the fuel electrode of a fuel cell such as cell 11 of FIGURE 1.

*Example 4*

Example 1 is repeated, except the silver microparticles involved are the fraction below 325 mesh, running from just under 325 mesh down to the order of about one micron. Moreover, the macroparticles obtained were screened and the 20 mesh to 50 fraction is used in this example for sintering to form the electrode. An electrode of relatively good macro and micropore structure is obtained; however, compared to Example 1, the size of the macropores is a bit large, resulting in some comparative loss in power density in operation with a molten carbonate fuel cell system like that of FIGURE 1.

*Example 5*

The procedure of Example 1 is repeated, except that the electrode resulting from the final sintering operation is painted with three grams of nickel resinate (9.4 percent nickel metal content). It is then heated to 700° C. for one-half hour in an oven. The result obtained is that nickel oxide is dispersed throughout the electrode body to provide an effective catalyst. The electrode is found to function satisfactorily as a fuel electrode in the fuel cell of FIGURE 1.

*Example 6*

The procedure of Example 1 was repeated, except three grams of nickel resinate (9.4 percent nickel metal) are painted over the macroparticles prior to sintering them. They are heated to 500° C. for 30 minutes in a hydrogen atmosphere to drive off the organic components of the nickel resinate, leaving nickel and nickel oxide well dispersed throughout the pore structure of the macroparticles. Thereafter, the macroparticles are processed in a similar manner to Example 1. The product obtained has the end catalytic components distributed throughout the electrode and serves well as a fuel electrode.

*Example 7*

Nickel microparticles on the order of one micron and below are thoroughly mixed with silver particles of about 5 to 10 microns particle size, in the ratio of about one part of nickel to 10 parts of silver. The resulting mixture is pre-sintered at about 600° C. for one hour in a hydrogen atmosphere and then broken up into macroparticles of from 50 to 100 mesh. An electrode is made by sintering the macroparticles as in Example 1, except at a temperature of 850° C. for one hour in an inert atmosphere of argon. A catalytically active electrode with good micropore and macropore structure is obtained.

*Example 8*

Example 1 is repeated, except the final sintering operation is conducted with the weight-compacted mass of macroparticles dispersed in the steel ring upon the top of an impervious alumina plate instead of upon the silver layered magnesium oxide disk. The sintered electrode product is quite similar to the electrode of Example 1, but it is not bonded to the structure that it rested upon during the sintering operation. The free disk of silver produced provides good mass transfer as well as providing high pore surface contact area. It is usable generally as a porous reaction medium with a specific application for service being as a porous air electrode for fuel cell service. Incorporation of a catalyst by one of the methods of the foregoing examples, involving a catalyst, makes a silver disk of this type quite satisfactory for fuel electrode service. It does not require anything in addition to its regular silver content to function well as an air electrode.

*Example 9*

A plating bath is prepared by mixing the following in one liter of distilled water:

| | |
|---|---|
| Nickel sulfate hexahydrate | grams__ 300 |
| Nickel chloride hexahydrate | do____ 50 |
| Activated carbon (Darco S-51) granules ranging from about 325 mesh to on the order of about one micron in size | grams__ 6.5 |
| Methanol | ml__ 60 |

The bath is placed in the apparatus illustrated in FIGURE 5 and raised to a temperature of 180° F., at which it is approximately maintained by an external burner manually controlled with reference to a thermometer in the bath. The pH of the bath is adjusted to about 4 to 6 by the addition of small quantities of acid and/or base, as required. Plating is conducted at a current density of approximately 250 amps. per square foot of cathode area (the voltage being in the range of 8 to 10 volts) using nickel anodes and a stainless steel wire as a cathode. The cathode is periodically removed from the bath and the dendritic, knobby growth which plated thereon is scraped off and collected. After a sufficient quantity of nickel dendritic growth is obtained, it is washed with hot water and methyl alcohol, dried in air, crushed to produce particles in the predominantly macroparticle size range and sieved to obtain a 100 to 150 mesh fraction. Five grams of the 100 to 150 mesh fraction of nickel dendrite particles are then placed in a mild steel ring upon a porous magnesia disk and lightly compacted in similar manner to that illustrated in FIGURE 4 and described previously herein in connection therewith. The compacted particle mass on the porous disk is then sintered for two hours at 850° C. in a dry hydrogen atmosphere. The resulting product is allowed to cool in the hydrogen atmosphere of the oven. An electrode of good macro and micro structure is obtained from the foregoing procedure. When this electrode is utilized (for example as a fuel electrode) in a molten carbonate fuel cell of an electrolyte in a 50–50 mole percent sodium-lithium carbonate, the micropore structure is found to become substantially more effective after a short period of operation in view of the leaching of the carbon granules from the electrode. The electrode of this example is found to function efficiently to provide both good mass transfer and a comparatively large contact area between the electrolyte and gaseous reactant (for example hydrogen gas when the electrode is used as a fuel electrode).

*Example 10*

The preceding example (Example 9) is repeated except that the activated carbon granules and methanol are omitted from the bath. The ultimate product obtained is found to have substantial microporosity within its macroparticles; however, the microporosity is not so good as that obtained in the preceding example.

*Example 11*

The foregoing procedure was repeated except that the nickel chloride hexahydrate utilized in the plating bath of the preceding example (Example 10) is omitted. The electrode made from the 150 to 200 mesh nickel dendrite particles was found to function effectively in a sodium-lithium carbonate fuel cell system. The mass transfer provided by the electrode is quite efficient and the contact area provided by the micropore structure is quite high compared to conventional porous electrodes. For example, a nickel electrode made in accordance with the foregoing is utilized as a fuel electrode in a fuel cell having a 50–50 mole percent sodium-lithium carbonate eutectic electrolyte and operating at a temperature of about 600° C. The nickel electrode weighs approximately five grams and has an electrode area of about 1/60 square foot. Hydrogen gas in large excess (as compared to consumption at the electrode) is fed to the nickel fuel electrode. Oxidizer gas consisting of a mixture of air and carbon dioxide in large excess (as compared to consumption at the electrode) is fed to the oxidizer electrode of the fuel cell. The oxidizer electrode is a conventional porous electrode of silver. The cell is found to give a power output of about 50 watts per square foot of projected electrode surface area.

*Example 12*

A plating bath is made by mixing the following materials in one liter of distilled water:

| | Grams |
|---|---|
| Nickel sulfate hexahydrate | 200 |
| Nickel chloride hexahydrate | 44 |
| Ferrous sulfate heptahydrate | 200 |
| Ferrous chloride hexahydrate | 44 |
| Boric acid | 30 |

The resulting plating solution is adjusted to a pH of about 1 and utilized at a temperature of from 160° F. to 200° F. in plating operation in the apparatus illustrated in FIGURE 5 at a current density of approximately 250 amps. per square foot. A dendritic growth of relatively porous nature forms on the stainless steel cathode. The growth is found to consist of approximately 74% nickel and 26% iron.

After collection of sufficient quantity of the dendritic growth of this example, five grams of 150 to 200 mesh crushed dendrites obtained by grinding the growth by mortar and pestle are used to form an electrode in accordance with the technique described in the preceding examples. While the micropore structure is not quite so good as in the instances where small carbon granules are used in the bath, a comparatively large number of small micropores are still found to be present in the macroparticles of the electrode.

*Example 13*

The preceding example (Example 12) is repeated except that five grams of activated carbon granules and 50 mls. of methanol are incorporated in the bath. The ultimate product obtained is found to have a superior micropore structure to that obtained in the preceding example.

*Example 14*

A plating bath is made by mixing the following materials in one liter of distilled water:

| | Grams |
|---|---|
| Silver cyanide | 36 |
| Potassium cyanide | 60 |
| Potassium carbonate | 45 |

The bath is adjusted to a pH of approximately 10 and maintained at a temperature of 80° F. to 100° F. When a plating operation is conducted in accordance with the procedure described in connection with FIGURE 5, a silver dendritic growth deposits on the cathode. The silver growth is collected by scraping it periodically from the cathode.

Three grams of dendritic silver particles obtained by grinding the growth and sieving it to collect the 80 to 100 mesh particle fraction and are gathered and sintered in accordance with the technique described previously herein to form an electrode on a magnesia disk. The resulting electrode is found to have good mass transfer characteristics provided by the macropore structure and the various macroparticles (80 to 100 mesh dendrite particles) possess a plurality of micropores. The electrode is found to function quite efficiently as a fuel electrode (with oxygen and carbon dioxide or air and carbon dioxide as an oxidizer, for example) in a molten carbonate fuel cell having a 50–50 mole percent sodium-lithium carbonate electrolyte.

*Example 15*

The preceding example is repeated except that five grams of activated carbon granules of a granule size somewhat less than 325 mesh are incorporated in the electroplating bath from which the silver electrode material is grown. Also, about 50 mls. of a wetting agent (methanol) are added. The electrode ultimately obtained in this example is found to have a better micropore structure than in the preceding example (Example 14). The carbon granules are removed in accordance with this example prior to utilization in a fuel cell by oxidizing the carbon in an oxygen atmosphere at 600° C. for about 30 minutes. Alternatively, the carbon may be leached out of the electrode by the sodium-lithium carbonate eutectic electrolyte when the electrode is used in such a system.

*Example 16*

Example 12 is repeated except that the plating bath contains about five grams of a suspension of small granules of an alloy of nickel and manganese (approximately 4% manganese, the balance being nickel). The plating operation produces a dendritic nickel growth with a small amount of manganese incorporated therein. The particles obtained by grinding and sieving the electroplated deposit are of a dendritic structure and have substantial microporosity. Particles collected in the 100 to 200 mesh fraction have granules of the nickel-manganese alloy entrapped therein. On sintering the sieved dendritic particles (100 to 200 mesh fraction) in accordance with the technique described in connection with FIGURE 4, an electrode is obtained that has good micro and macropore structure. It is noted that the manganese serves as a hardening agent; moreover, it can enhance catalytic activity for certain applications.

*Example 17*

A porous magnesium oxide disk of the type illustrated at 17 in FIGURE 4 is a flame sprayed on its surface with a thin electrical conducting layer of nickel (analogous to the layer 65 of FIGURE 4). An electrical lead is clamped to the resulting flame sprayed layer of the nickel and the disk bearing the layer is immersed within the bath illustrated in FIGURE 5. The electrical lead to the flame sprayed layer of nickel is connected so that the flame sprayed layer serves as the cathode, replacing the cathode 79 of FIGURE 5. The plating bath utilized consists of the following materials in one liter of distilled water:

| | |
|---|---|
| Nickel sulfate hexahydrate _____________grams__ | 300 |
| Activated carbon (Darco S–51) of a particle size of 325 mesh and smaller _______________grams__ | 6.5 |
| Methanol _______________________________mls__ | 60 |

A thin layer of porous, knobby, dendritic nickel is plated upon the flame sprayed nickel material, while the plating bath is at a temperature of about 180° F. and at a pH of about 4 to 6. A current density of approximately 200 to 250 amps. per square foot is maintained during plating. The disk is removed from the plating bath and washed thoroughly with water and thereafter dried at about 230° F. in air.

An electric conductor to serve in analogous manner to the wires 33 and 35, illustrated in FIGURE 1, is next prepared. The portion of the conductor which is ultimately to be in contact with the electrode is immersed in the plating bath referred to above in this example, wherein it serves as the cathode (analogous to cathode 79 in FIGURE 5), and a thin layer of dendritic nickel is plated upon it. The plated conductor is removed from the bath and washed and dried.

A mild steel ring, such as the ring 61 of FIGURE 4, is placed about the flame sprayed-plated area on the magnesium oxide disk surface and nicked dendrite particles, prepared in accordance with Example 9, are placed within it, with the plated end of the conductor extending below the surface of the particle mass and with the other end of the conductor extending out of the particles (as on the side portion of the upper face of the particle mass). Thereafter the disk and particle mass are treated as described in Example 9 to form an electrode by sintering.

After the sintered electrode which results from this procedure has formed, the electrode and disk assembly are cooled in the oven (in contact with the reducing atmosphere therein). On removal from the oven, it is found that a quite satisfactory electrode of very good macro and microporosity results.

If the end of the plated conductor of this example is spread throughout the cross section of the electrode, even voltage distribution and quite good electrical contact between the electrode and its conductive lead wire are insured. A dentritically nickel plated circular wire screen embedded in the electrode with a wire or tab extending upwardly therefrom, can be effectively used for such purpose, if desired.

In the electroplating aspect of this invention, it is found that metals generally which may be plated are utilizable. For example, nickel, silver, iron, cobalt, copper and manganese may be used. Moreover, various mixtures and alloys of the foregoing metals have desirable characteristics in certain applications.

The microparticles for the pre-sintering aspect of one embodiment of this invention should have a particle size of from about 250 mesh down to the order of about one micron, preferably from about 325 mesh down to the order of about one micron. The preferred range is particularly applicable to a molten carbonate fuel cell.

The macroparticles for the sintering operation should have a particle size of from about 20 mesh to about 250 mesh, preferably from about 100 to 200 mesh, particularly for a molten carbonate electrolyte system.

It is to be understood that particle size herein refers to the small dimension of a particle which controls its passage through a screen. Thus a particle that will just pass through a 325 mesh screen is referred to as having a particle size less than about 325 mesh. When both upper and lower particle size limits are referred to, in respect of giving the size of a particle and screen size is involved in the reference, unless otherwise specified it is intended that all particles that will pass through the largest screen referred to, but not pass through the smallest screen referred to, are those particles falling within the size limits. Thus, 100 to 200 mesh refers to particles that will pass through a 100 mesh screen but not through a 200 mesh screen. A particle size referred to in microns is to be treated as referring to the smallest diameter of the particle, i.e. the dimension that would control passage through a screen. Thus, a particle size of from about 325 mesh down to the order of about one micron means that the particles would all pass through a 325 mesh screen but do not have a minimum diameter any smaller than of the order of about one micron.

All screen sizes referred to herein are to be taken as American Screen Sizes (often referred to as Tyler Sieve Series).

It is to be understood that the terms "macroparticles" and "microparticles" are relative and that both refer to small particles, the latter being comparatively smaller than the former.

It has been seen that catalyst may be dispersed throughout the porous reaction medium of this invention in various ways, and, accordingly, when a catalyst is recited in the claims hereof, it is not intended that a claim be limited in any way by the method of deposition of the catalyst, unless the claim clearly specifies to the contrary.

A volatile agent, in the nature of a "burn-out" agent, can be employed in connection iwth this invention when it is desired. For example, ammonium bicarbonate may be employed in pre-sintering or sintering. While a burn-out agent may sometimes prove a valuable adjunct, it should be remembered that the burn-out agent employed alone, without the microparticle-macroparticle approach of this invention, cannot produce the combination of the macropore structure, with the labyrinth of interconnecting, interstitial spaces, and fine micro structure of this invention.

Although various materials may be used for porous reaction media in accordance with this invention, nickel, silver, iron, cobalt, copper and manganese and alloys of these metals are preferred for electrode structure.

It has been seen that this invention provides a reaction medium (and the method of making same) having a multiplicity of macroparticles joined together by structure into a matrix of macroparticles that has a labyrinth of interconnecting, interstitial spaces therein. In one embodiment, each of the macroparticles is made up of a plurality of microparticles joined together to define a macroparticle structure having a plurality of fine pores. In another embodiment, each of the macroparticles is porous as a result of the nature of the electrodeposit from which the macroparticles are obtained.

The labryrinth of interconnecting, interstitial spaces in the matrix of the macroparticle mass provides good mass transfer of fluids to and from the fine pore structure in the various macroparticles. The contact area made available for reactants by the many fine pores throughout the reaction medium is quite large. Thus, an electrode capable of use to provide a high power density is provided. Moreover, it can be seen that this invention achieves its other objects set out hereinabove.

Having described the invention in connection with certain specific embodiments thereof, it is to be understood that further modifications may now suggest themselves to those skilled in the art and it is intended to cover such modifications as fall within the scope of the appended claims.

What is claimed is:

1. A method for making a reaction medium comprising; forming a porous particle growth by electroplating upon an electrode a metal selected from the group consisting of nickel and nickel alloys, silver and silver alloys, iron and iron alloys, cobalt and cobalt alloys, copper and copper alloys, and manganese and manganese alloys, from a plating solution comprising the ions of said metal and a multiplicity of suspended small pore-forming granules possessing properties which permit their subsequent removal from electroplated metal in which they are entrapped;
  comminuting said growth to obtain a multiplicity of porous particles therefrom;
  gathering comminuted particles so obtained into a mass;
  and heating said mass of particles at a sintering temperature to join said mass of particles into a porous matrix.

2. The method of claim 1 wherein said metal consists essentially of nickel.

3. The method of claim 1 in which said metal consists essentially of silver.

4. The method of claim 1 wherein said metal consists essentially of iron.

5. The method of claim 1 wherein said metal consists essentially of manganese.

6. The method of claim 1 wherein said metal consists essentially of cobalt.

7. The method of claim 1 in which said pore-forming granules are conductive and in which a major proportion of said pore-forming granules are no larger than about 325 mesh.

8. The method of claim 7 in which said pore-forming granules consist essentially of carbon.

9. The method of claim 7 in which said pore-forming granules consist essentially of an alloy of nickel and manganese.

10. The method of claim 8 in which said metal consists essentially of nickel.

11. The method of claim 8 in which said metal consists essentially of silver.

12. The method of claim 8 in which said metal consists essentially of iron.

13. The method of claim 8 in which said metal consists essentially of manganese.

14. The method of claim 8 in which said metal consists of cobalt.

15. A method for making an electrode comprising:
  electroplating a metallic growth of generally dendritic structure upon an electrode at current densities of no less than about 150 amps. per square foot from a plating solution comprising a multiplicity of suspended minute granules of carbon of no larger than about 325 mesh, a wetting agent for said granules, and ions selected from the group consisting of nickel, silver, iron, cobalt, copper and manganese;
  comminuting said growth to obtain a multiplicity of particles therefrom containing said carbon granules therein; and
  joining particles obtained from said growth together to form an electrode.

16. The method of claim 15 in which the joining of said particles obtained from said growth to form said electrode is accomplished by heating said particles of said growth while gathered in a mass at a sintering temperature.

17. The method of claim 15 in which said ions consists essentially of ions of nickel and in which said wetting agent is methyl alcohol.

18. The method of claim 15 in which said ions consist essentially of ions of silver and in which said wetting agent is methyl alcohol.

References Cited
UNITED STATES PATENTS

| | | | |
|---|---|---|---|
| 2,671,953 | 3/1954 | Balke | 29—182 |
| 3,020,327 | 2/1962 | Ruetschi | 136—120 |
| 3,160,527 | 12/1964 | Hess | 136—120 |

OTHER REFERENCES

Treatise on Powder Metallurgy, vol. I, pp. 65–66, and 81–89, 1949.

WINSTON A. DOUGLAS, *Primary Examiner.*

A. SKAPARS, *Assistant Examiner.*